US012613088B2

(12) United States Patent
Takata et al.

(10) Patent No.: US 12,613,088 B2
(45) Date of Patent: Apr. 28, 2026

(54) STRAIN GAUGE INCLUDING BARRIER LAYER OVER RESISTOR BODY

(71) Applicant: MINEBEA MITSUMI Inc., Nagano (JP)

(72) Inventors: Shintaro Takata, Nagano (JP); Shinya Toda, Nagano (JP); Toshiaki Asakawa, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 243 days.

(21) Appl. No.: 18/259,879

(22) PCT Filed: Dec. 27, 2021

(86) PCT No.: PCT/JP2021/048599
§ 371 (c)(1),
(2) Date: Jun. 29, 2023

(87) PCT Pub. No.: WO2022/149529
PCT Pub. Date: Jul. 14, 2022

(65) Prior Publication Data
US 2024/0085167 A1 Mar. 14, 2024

(30) Foreign Application Priority Data

Jan. 7, 2021 (JP) ................................. 2021-001553

(51) Int. Cl.
*G01B 7/16* (2006.01)
(52) U.S. Cl.
CPC ..................................... *G01B 7/18* (2013.01)

(58) Field of Classification Search
None
See application file for complete search history.

(56) References Cited

U.S. PATENT DOCUMENTS 4,307,371 A 12/1981 Ort
5,631,622 A * 5/1997 Hauber ................. G01L 1/2287
156/247
11,262,181 B2 3/2022 Toda et al.
(Continued)

FOREIGN PATENT DOCUMENTS

CN 1648426 8/2005
CN 201266074 Y 7/2009
(Continued)

OTHER PUBLICATIONS

International Search Report for PCT/JP2021/048599 mailed on Mar. 1, 2022.
(Continued)

*Primary Examiner* — Eric S. McCall
*Assistant Examiner* — Nigel H Plumb
(74) *Attorney, Agent, or Firm* — IPUSA, PLLC

(57) ABSTRACT

A strain gauge includes a flexible substrate, a resistor on one surface of the substrate, an insulating layer covering the resistor, and a conductive barrier layer covering the insulating layer. The conductive barrier layer includes a first layer portion extending over a surface of the resistor via the insulating layer, and a second layer portion extending over side surfaces of the resistor via the insulating layer and continuously connected to the first layer portion.

7 Claims, 6 Drawing Sheets

1

(56) References Cited

U.S. PATENT DOCUMENTS

| | | | |
|---|---|---|---|
| 11,326,967 | B2 | 5/2022 | Toda et al. |
| 11,499,877 | B2 | 11/2022 | Misaizu et al. |
| 11,542,590 | B2 | 1/2023 | Asakawa et al. |
| 11,543,308 | B2 | 1/2023 | Yuguchi et al. |
| 11,543,309 | B2 | 1/2023 | Misaizu et al. |
| 11,702,730 | B2 | 7/2023 | Asakawa et al. |
| 11,747,225 | B2 | 9/2023 | Asakawa et al. |
| 11,774,303 | B2 | 10/2023 | Kitamura et al. |
| 11,786,125 | B2 | 10/2023 | Mikhail et al. |
| 12,306,053 | B2 * | 5/2025 | Takimoto .............. G01L 1/2287 |
| 2005/0163461 | A1 | 7/2005 | Ziebart et al. |
| 2019/0265015 | A1 | 8/2019 | Michiwaki |
| 2020/0292294 | A1 | 9/2020 | Misaizu et al. |
| 2020/0343027 | A1 | 10/2020 | Asakawa et al. |
| 2021/0018307 | A1 | 1/2021 | Toda et al. |
| 2021/0018382 | A1 | 1/2021 | Misaizu et al. |
| 2021/0033476 | A1 | 2/2021 | Toda et al. |
| 2021/0063133 | A1 | 3/2021 | Misaizu et al. |
| 2021/0131886 | A1 | 5/2021 | Toda et al. |

FOREIGN PATENT DOCUMENTS

| | | | |
|---|---|---|---|
| CN | 105424238 | | 3/2016 |
| CN | 107436123 | | 12/2017 |
| EP | 3705840 | | 9/2020 |
| JP | S55-042157 | U | 3/1980 |
| JP | S58-097607 | | 6/1983 |
| JP | H06-109411 | | 4/1994 |
| JP | H06-300649 | | 10/1994 |
| JP | 07098203 | * | 4/1995 |
| JP | H07-098203 | | 4/1995 |
| JP | 2004-301746 | | 10/2004 |
| JP | 2005-214970 | | 8/2005 |
| JP | 2015-031633 | | 2/2015 |
| JP | 2016-074934 | | 5/2016 |
| JP | 2018-040777 | | 3/2018 |
| JP | 2019-132790 | | 8/2019 |
| JP | 2020-187011 | | 11/2020 |
| JP | 2020187011 | A * | 11/2020 |
| JP | 2021-139804 | | 9/2021 |
| WO | 2019/088112 | | 5/2019 |
| WO | 2019/124458 | | 6/2019 |
| WO | 2019/244990 | | 12/2019 |

OTHER PUBLICATIONS

Office Action mailed on Dec. 3, 2024 with respect to the corresponding Japanese patent application No. 2021-001553.

Office Action mailed on Sep. 17, 2024 with respect to the corresponding Japanese patent application No. 2021-001553.

International Search Report of Int. Appl. No. PCT/JP2022/000985 dated Mar. 29, 2022.

Office Action mailed on Oct. 14, 2023 issued respect to the related Chinese patent application No. 202280010336.9.

Office Action mailed on Oct. 24, 2023 with respect to the related U.S. Appl. No. 18/261,351.

Office Action mailed on May 30, 2024 with respect to the related U.S. Appl. No. 18/261,351.

Notice of Allowance mailed on Jan. 24, 2025 with respect to the related U.S. Appl. No. 18/261,351.

* cited by examiner

STRAIN GAUGE INCLUDING BARRIER LAYER OVER RESISTOR BODY

TECHNICAL FIELD

The present disclosure relates to a strain gauge.

BACKGROUND ART

Conventionally, a strain gauge is attached to an object to be measured, and the strain of the measurement object is detected. The strain gauge has a resistor for detecting strain, and the resistor is formed, for example, on insulating resin. The resistor is connected to an electrode via a conductive trace, for example (see Patent Document 1, for example).

CITATION LIST

Patent Document

Patent Document 1: Japanese Unexamined Patent Application Publication No. 2016-74934

SUMMARY OF THE INVENTION

Problem to be Solved by the Invention

With the strain gauge described above, noise is superimposed on the resistor and appears in the output voltage, which then leads to a decrease in the accuracy of measurement. In particular, in the case of a strain gauge with a high gauge factor, the impact of noise is remarkable.

The present disclosure has been prepared in view of the above, and an object of the present disclosure is therefore to provide a strain gauge that can reduce the noise superimposed on the resistor.

Means for Solving the Problem

The strain gauge according to the present disclosure includes: a flexible substrate; a resistor made from a film containing Cr, CrN, and $Cr_2N$, on one surface of the substrate; an insulating layer covering the resistor; and a conductive barrier layer covering the insulating layer.

Advantageous Effects of the Invention

According to the technique disclosed herein, it is possible to provide a strain gauge that can reduce the noise superimposed on the resistor.

EMBODIMENTS FOR CARRYING OUT THE INVENTION

An embodiment of the present disclosure will be described below with reference to the accompanying drawings. In each drawing, the same components will be assigned the same reference signs and redundant description may be omitted.

First Embodiment

Figure 1:
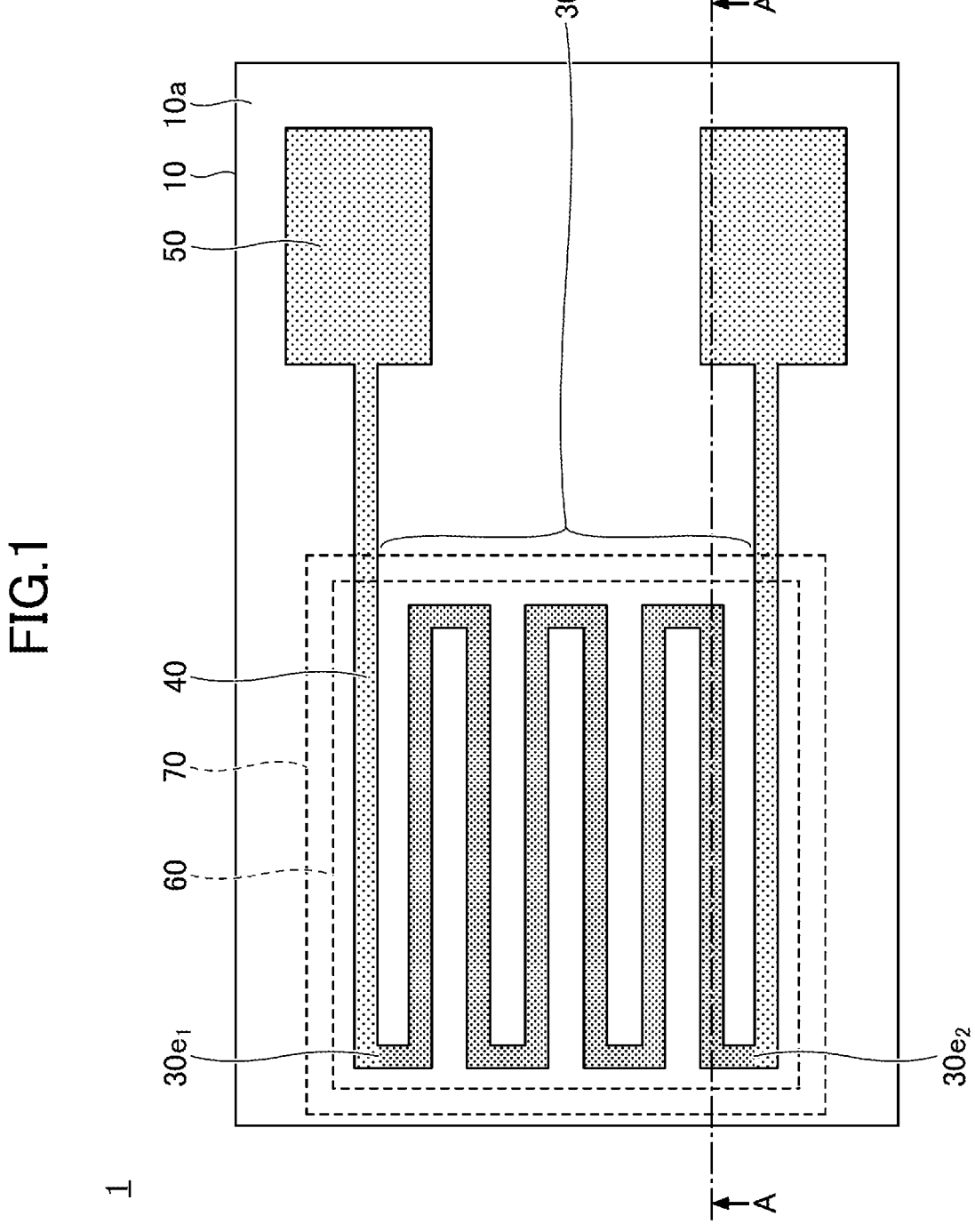
FIG. 1 is a plan view of an example of a strain gauge according to a first embodiment.
Figure 2:
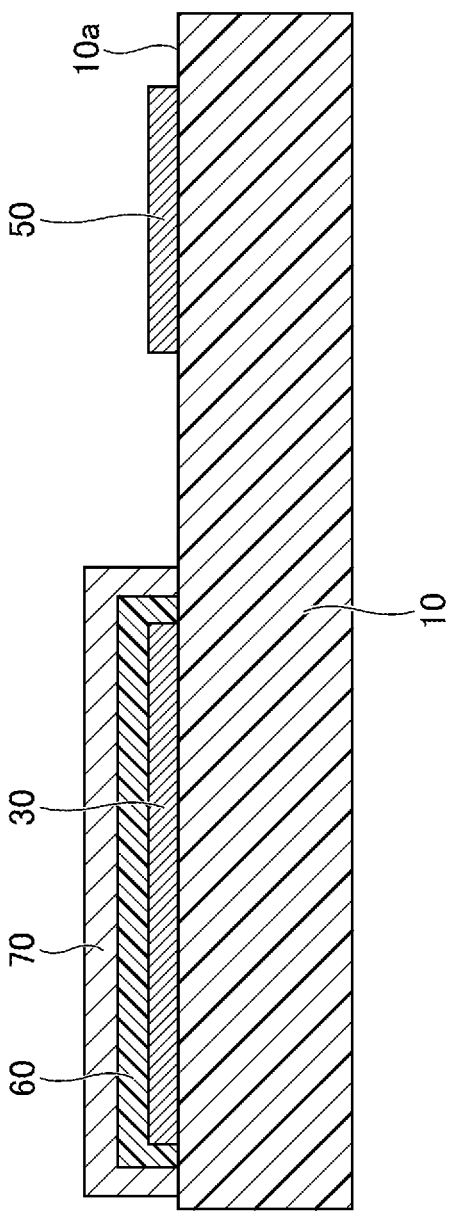
FIG. 2 is a cross-sectional view (example 1) that illustrates an example of the strain gauge according to the first embodiment.

FIG. 1 is a plan view that illustrates a strain gauge according to a first embodiment. FIG. 2 is a cross-sectional view that illustrates the strain gauge according to the first embodiment, showing a cross-section along line A-A in FIG. 1. Referring to FIG. 1 and FIG. 2, a strain gauge 1 has a substrate 10, a resistor 30, conductive traces 40, electrodes 50, an insulating layer 60, and a barrier layer 70.

Note that, with the present embodiment, for ease of explanation, the side of the substrate 10 in the strain gauge 1 on which the resistor 30 is provided will be referred to as "the upper side" or "one side," and the side of the substrate 10 on which the resistor 30 is not provided will be referred to as "the lower side" or "the other side." Furthermore, in each component or part, the surface on the side where the resistor 30 is provided will be referred to as "one surface" or "the upper surface," and the surface on the side where the resistor 30 is not provided will be referred to as "the other surface" or "the lower surface." However, the strain gauge 1 can be used upside down, or can be disposed at any angle. Furthermore, plan view herein means that an object is viewed in a direction normal to an upper surface 10a of the substrate 10, and plan shape herein refers to the shape of an object as viewed in a direction normal to the upper surface 10a of the substrate 10.

The substrate 10 is a member that serves as a base layer for forming the resistor 30 and the like, and is flexible. The thickness of the substrate 10 is not particularly limited and can be selected in accordance with the purpose of use. For example, the substrate 10 may be approximately 5 μm to 500 μm thick. In particular, it is preferable if the substrate 10 is 5 μm to 200 μm thick, because the transmission of strain from the surface of the strain generating body joined to the lower surface of the substrate 10 via a bonding layer or the like, the dimensional stability in the environment, and so forth are excellent. It is even more preferable if the substrate is 10 μm thick or more because the insulation is excellent.

The substrate 10 can be formed from an insulating resin film made of, for example, a polyimide (PI) resin, an epoxy resin, a polyether ether ketone (PEEK) resin, a polyethylene naphthalate (PEN) resin, a polyethylene terephthalate (PET) resin, a polyphenylene sulfide (PPS) resin, a liquid crystal polymer (LCP) resin, a polyolefin resin, and so forth. Note that a film herein refers to a flexible member that is approximately 500 μm thick or less.

Here, "the substrate 10 can be formed from an insulating resin film" by no means precludes the substrate 10 from containing fillers, impurities, and so forth, in the insulating resin film. The substrate 10 may be formed from, for example, an insulating resin film that contains fillers such as silica or alumina.

Examples of materials of the substrate 10 other than resin include crystalline materials such as $SiO_2$, $ZrO_2$ (including YSZ), Si, $Si_2N_3$, $Al_2O_3$ (including sapphire), ZnO, perovskite ceramics ($CaTiO_3$, $BaTiO_3$, etc.) and so forth. Further, additional examples include amorphous glass and the like. Furthermore, as materials of the substrate 10, metals such as aluminum, an aluminum alloy (duralumin), titanium, and others may be used. In this case, for example, an insulating film is formed on the substrate 10 of metal.

The resistor 30 is a thin film formed on the substrate 10 in a predetermined pattern, and is a sensitive part configured such that that resistance changes in response to strain. The resistor 30 may be formed directly on the upper surface 10a of the substrate 10, or may be formed on the upper surface 10a of the substrate 10 via other layers. Note that, in FIG. 1, the resistor 30 is shown with a dark satin pattern for ease of explanation.

The resistor 30 has a plurality of elongated portions, arranged at predetermined intervals with their longitudinal directions oriented in the same direction (the direction of line A-A in FIG. 1), and the ends of adjacent elongated portions are alternately connected to form a zigzag structure on the whole. The longitudinal direction of the elongated portions is the grid direction, and the direction perpendicular to the grid direction is the grid width direction (the direction of line B-B in FIG. 1).

Ends of the two elongated parts in the longitudinal direction, located on the outermost side in the grid width direction, are bent in the grid width direction, and form respective ends $30e_1$ and $30e_2$ of the resistor 30 in the grid width direction. The ends $30e_1$ and $30e_2$ of the resistor 30 in the grid width direction are electrically connected with the electrodes 50 via the conductive traces 40. In other words, the conductive traces 40 electrically connect the ends $30e_1$ and $30e_2$ of the resistor 30 in the grid width direction with respective electrodes 50.

The resistor 30 can be made of, for example, a material containing Cr (chromium), a material containing Ni (nickel), or a material containing both Cr and Ni. That is, the resistor 30 can be made of a material containing at least one of Cr and Ni. Materials containing Cr include, for example, a Cr composite film. Materials containing Ni include, for example, Cu—Ni (copper nickel). Materials containing both Cr and Ni include, for example, Ni—Cr (nickel chromium).

Here, a Cr composite film refers to a composite film of Cr, CrN, $Cr_2N$, and the like. A Cr composite film may contain incidental impurities such as chromium oxide.

The thickness of the resistor 30 is not particularly limited and can be selected in accordance with the purpose of use. The resistor 30 can be, for example, approximately 0.05 μm to 2 μm thick. In particular, it is preferable if the resistor 30 is 0.1 μm thick or more, because the crystallinity of crystals (for example, the crystallinity of α-Cr) constituting the resistor 30 improves. It is even more preferable if the resistor 30 is 1 μm thick or less, because the cracks in the film constituting the resistor 30 due to the film's internal stress, and the warping of the film from the substrate 10 can be reduced. The width of the resistor 30 may preferably be optimized in accordance with the required specifications such as the resistance value and the lateral sensitivity, and be set to, for example, approximately 10 μm or more and 100 μm or less, as a countermeasure against disconnections.

For example, if the resistor 30 is a Cr composite film, the stability of gauge characteristics can be improved by using α-Cr (alpha-chromium), which has a stable crystalline phase, as the main component. Additionally, when the resistor 30 contains α-Cr as its main component, the strain gauge 1 can have a gauge factor of 10 or higher, as well as a gauge factor temperature coefficient TCS and a resistance temperature coefficient TCR in the range of −1,000 ppm/degrees Celsius to +1,000 ppm/degrees Celsius. Here, "the main component" means that the substance of interest takes up 50% or more, by weight, of all substances constituting the resistor. It is preferable if the resistor 30 contains 80% or more of α-Cr by weight, and more preferable if the resistor 30 contains 90% or more of α-Cr by weight, from the perspective of improving the gauge characteristics. Note that α-Cr is a Cr having a body-centered cubic structure (bcc structure).

Also, when the resistor 30 is a Cr composite film, the CrN and $Cr_2N$ contained in the Cr composite film are preferably 20% or less by weight. When the CrN and $Cr_2N$ contained in the Cr composite film are 20% or less by weight, the decrease in the gauge ratio can be reduced.

Furthermore, the proportion of $Cr_2N$ in CrN and $Cr_2N$ is preferably 80% or more by weight and less than 90% by weight, and, more preferably, 90% or more by weight and less than 95% by weight. When the proportion of $Cr_2N$ in CrN and $Cr_2N$ is 90% or more by weight and less than 95% by weight, $Cr_2N$, which has semiconductor-like properties, makes the decrease of TCR (negative TCR) more noticeable. Furthermore, reduced use of ceramic materials enables the reduction of brittle fracture as well.

Meanwhile, when a small amount of $N_2$ or atomic N gets mixed or is present in the film, the external environment (for example, high temperature environment) might make them escape from the film, which might result in a change in the film stress. By creating a chemically stable CrN, a stable strain gauge can be obtained without generating the above unstable N.

The conductive traces 40 are formed on the substrate 10. The electrodes 50 are formed on the substrate 10, and electrically connected to the resistor 30 via the conductive traces 40. For example, the electrodes 50 are wider than the conductive traces 40 and formed in a substantially rectangular shape. The electrodes 50 are a pair of electrodes for outputting the strain-induced changes in the resistance value of the resistor 30 to the outside, and are connected to lead wires for external connection, for example. In FIG. 1, for ease of explanation, the conductive traces 40 and the electrodes 50 are shown with a satin pattern that is sparser than that of the resistor 30.

Note that the resistor 30, the conductive traces 40, and the electrodes 50 are assigned different reference signs for ease of explanation, but they can be formed integrally from the same material through the same process. Therefore, the resistor 30, the conductive traces 40, and the electrodes 50 have substantially the same thickness.

The upper surfaces of the conductive traces 40 and the electrodes 50 may be covered by a metal that is made of a material having a lower resistance than the conductive traces 40 and the electrodes 50. For example, when the resistor 30, the conductive traces 40, and the electrodes 50 are a Cr composite film, the metallic material having a lower resistance than the Cr composite film may be Cu, Ni, Al, Ag, Au, or Pt, an alloy of any of these metals, a compound of any of these metals, or a laminated film obtained by appropriately laminating any of these metals, alloys, or compounds.

The insulating layer 60 is provided on the upper surface 10a of the substrate 10 so as to cover the resistor 30 and expose the electrodes 50. As long as the insulating layer 60 covers at least the resistor 30, the insulating layer 60 may further cover part or all of the conductive traces 40. The insulating layer 60 is preferably provided so as to cover the upper surface and the side surfaces of the resistor 30 in a continuous fashion.

The insulating layer 60 is formed from an insulating organic material. Examples of the material for the insulating layer 60 include a PI resin, an epoxy resin, a PEEK resin, a PEN resin, a PET resin, a PPS resin, a polyethylene (PE) resin, a polyvinylidene chloride (PVDC) resin, a polyvinylidene fluoride (PVDF) resin, a polytetrafluoroethylene (PTFE) resin, a polypropylene (PP) resin, butyl rubber, silicone rubber, a composite resin (for example, a silicone resin, a polyolefin resin, etc.), and so forth. The insulating layer 60 may contain fillers or pigments. The thickness of the insulating layer 60 is not particularly limited and can be selected in accordance with the purpose of use, and may be, for example, approximately 0.1 μm to 30 μm. By setting the insulating layer 60 to such a thickness, its upper surface becomes flat, so that the barrier layer 70 can be formed easily on the insulating layer 60. In addition, the flatter the upper surface of the insulating layer 60, the more the stress is relaxed in various bending directions, so that peeling of the barrier layer 70 can be prevented.

The insulating layer 60 may be made from an insulating inorganic material. In this case, examples of the material of the insulating layer 60 include metals such as Cu, Cr, Ni, Al, Fe, W, Ti, and Ta, as well as oxides, nitrides, and nitrogen oxides of alloys containing these metals. Examples of the material of the insulating layer 60 further include semiconductors such as Si and Ge, as well as oxides, nitrides, and nitrogen oxides of these semiconductors. The thickness of the insulating layer 60 is not particularly limited, and may be, for example, approximately 0.01 μm to 2 μm.

Note that, if the Young's modulus of the insulating layer 60 is high, the gauge factor of the strain gauge 1 might decrease. Generally speaking, an organic material such as a PI resin has a lower Young's modulus than an inorganic material such as $SiO_2$. It then follows that, from the perspective of preventing the gauge factor of the strain gauge 1 from decreasing, it is preferable to use an organic material having a low Young's modulus for the material of the insulating layer 60. From the perspective of preventing a decrease in gauge factor, the Young's modulus of the insulating layer 60 is preferably 0.1 GPa or more and 10 GPa or less.

Also, it is preferable if the linear expansion coefficient of the insulating layer 60 is close to the linear expansion coefficient of the substrate 10. When the difference between the linear expansion coefficient of the insulating layer 60 and the linear expansion coefficient of the substrate 10 increases, increased strain arises due to the difference in expansion with respect to temperature changes, making the resistance value of the resistor 30 vary more significantly. Conversely, making the linear expansion coefficient of the insulating layer 60 close to the linear expansion coefficient of the substrate 10 brings about an effect of reducing the TCR. For example, the material of the insulating layer 60 may be the same as the material of the substrate 10. Also, the thickness of the insulating layer 60 may be the same as the thickness of the substrate 10.

The barrier layer 70 is provided so as to cover the insulating layer 60. The barrier layer 70 is a layer that is formed to reduce the noise superimposed on the resistor 30, and is made from a conductive material. The barrier layer 70 is insulated from the resistor 30 by means of the insulating layer 60. In addition, in the present disclosure, a conductive material refers to a material having a resistivity of 10 Ω·cm or less. When a material has a resistivity of 1 Ω·cm or more and 10 Ω·cm or less, an electromagnetic wave that reaches the surface of a conductor changes to an eddy current, and, by grounding and letting this current go out, a shielding effect can be achieved.

The barrier layer 70 can be formed from, for example, a metal, an alloy, or a laminated film in which metals and/or alloys are laminated. To be more specific, while Al may be a typical material for the barrier layer 70, it is equally possible to use, for example, Cu, Ni, Ag, Au, Pt, Pd, Sn, Cr, and so forth, an alloy of any of these metals, a laminated film obtained by laminating any of these metals or alloys appropriately, and so forth. However, the barrier layer 70 is by no means limited to metal insofar as it is made from a conductive material, and, for example, a ceramic containing a conductive material such as nanocarbon or the like may be used. Examples of ceramics containing a conductive material include those that contain a conductive material such as nanocarbon inside the ceramics ($ZrO_2$, $InO_2$, etc.), composite oxides such as an $Al_2O_3$—$MoSi_2$-based composite oxide, a BN—$TiB_2$-based composite oxide, etc. (composite compounds of conductive and insulating materials), and so forth.

Thus, with the strain gauge 1, the conductive barrier layer 70 is formed so as to cover the resistor 30 via the insulating layer 60. Accordingly, when noise arises around the strain gauge 1, the noise travels through the barrier layer 70, which is made from a conductive material, so that the noise superimposed on the resistor 30 can be reduced. As a result, the accuracy of measurement of the strain gauge 1 is unlikely to deteriorate. Note that the noise referred to here is, for example, electromagnetic wave noise from a measurement-target object such as a motor, noise due to static electricity, and so forth.

In particular, a highly sensitive strain gauge that uses a Cr composite film for the resistor 30 and that has a gauge factor of 10 or more is more sensitive than a conventional strain gauge having a gauge factor of less than 10, and so noise from the outside has a greater impact thereon, and the output voltage is more prone to measurement errors and variations. Therefore, forming the barrier layer 70 so as to cover the resistor 30 through the insulating layer 60 is particularly effective for a highly sensitive strain gauge that uses a Cr composite film for the resistor 30 and that has a gauge factor of 10 or more.

The barrier layer 70 is preferably provided so as to cover the upper surface and side surfaces of the resistor 30 in a continuous fashion, via the insulating layer 60. As a result of this, the noise reduction effect becomes greater than when the barrier layer 70 covers only the upper surface of the resistor 30 via the insulating layer 60. However, as long as the barrier layer 70 covers at least part of the resistor 30 via the insulating layer 60, a certain level of noise reduction effect can be achieved.

The thickness of the barrier layer 70 is preferably 0.1 μm or more. A sufficient level of noise reduction effect can be achieved by making the thickness of the barrier layer 70 0.1 μm or more. Also, by making the thickness of the barrier layer 70 0.1 μm or more, it is possible to prevent the gauge factor of the resistor 30 from decreasing. Also, the thickness of the barrier layer 70 is preferably less than the thickness at which cracks or defects occur at the strain limit value of the resistor 30. For example, if the resistor 30 is a Cr composite film and the material of the barrier layer 70 is Al, the thickness of the barrier layer 70 is preferably less than 1 mm.

Figure 3:
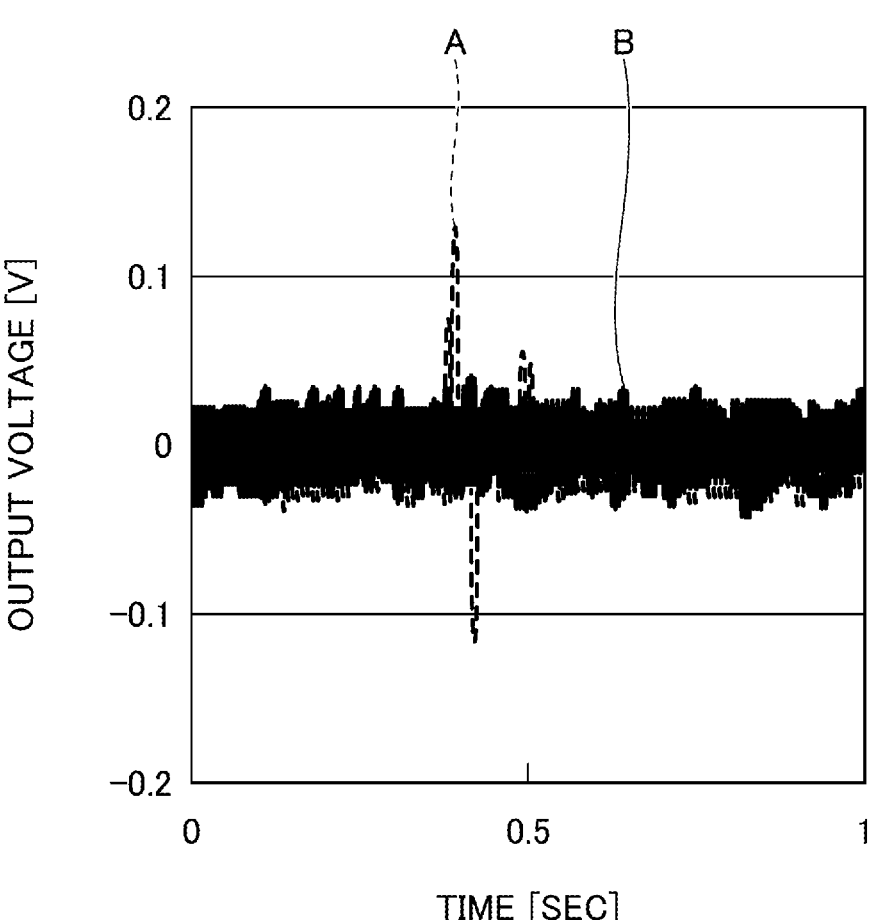
FIG. 3 shows an outcome (example 1) of an experiment for confirming a noise reduction effect of a barrier layer.
Figure 4:
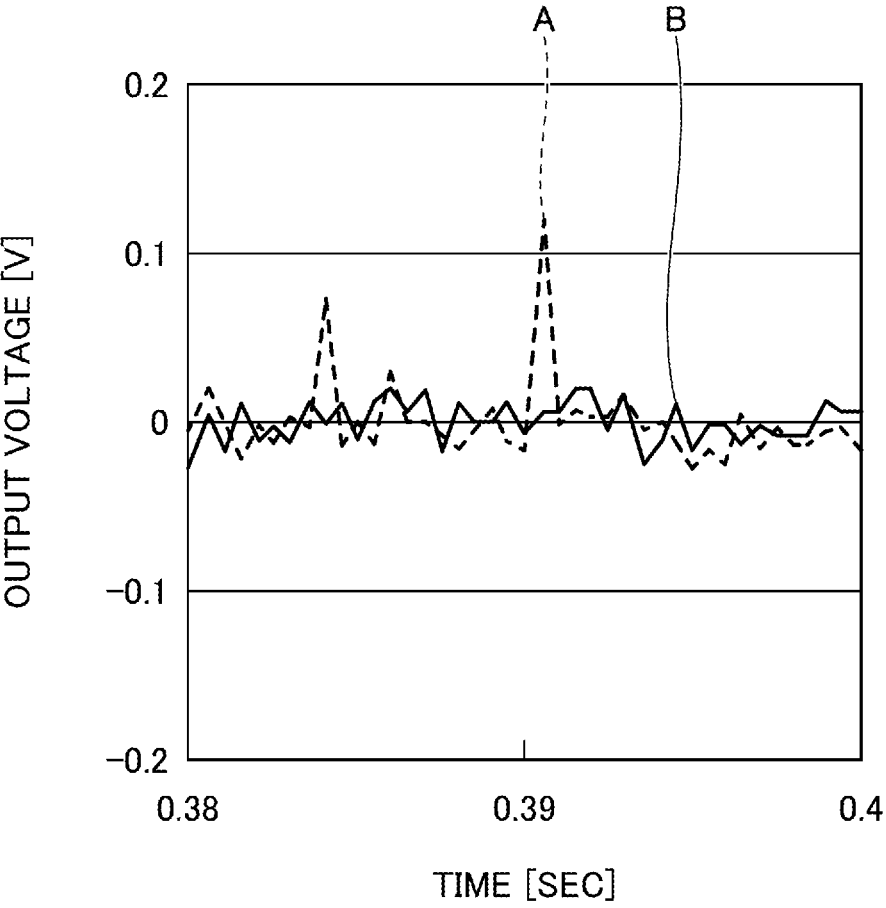
FIG. 4 shows an outcome (example 2) of an experiment for confirming a noise reduction effect of a barrier layer.

FIG. 3 and FIG. 4 show outcomes of experiments for confirming the noise reduction effect of the barrier layer. Note that, in FIG. 4, the time axis near noise in FIG. 3 is enlarged. In FIG. 3 and FIG. 4, in test sample A, a strain gauge having the structure shown in FIG. 1 and FIG. 2 without the barrier layer 70 is used, while, in test sample B, the barrier layer 70 is provided as in the strain gauge 1 having the structure shown in FIG. 1 and FIG. 2.

In test samples A and B, a Cr composite film having a film thickness of 200 nm is used as the resistor 30. Also, in test sample B, an Al film having a film thickness of 100 μm is used as the barrier layer 70. Static electricity of approximately 10 kV is used as a noise source. Furthermore, in order to remove the impact of noise on the temperature coefficient of resistance TCR, a pair of electrodes 50 was connected to a half-bridge circuit, and the output voltage is measured.

Referring to FIG. 3 and FIG. 4, in the case of test sample A in which the barrier layer 70 is not provided, at least two steep noises can be seen between 0.38 and 0.40 seconds. In contrast with this, in the case of test sample B in which the barrier layer 70 is provided, no sharp noise can be seen between 0.38 and 0.40 seconds. In this manner, by forming the barrier layer 70 so as to cover the resistor 30 via the insulating layer 60, the noise that is superimposed on the output voltage obtained via the pair of electrodes 50 is reduced, so that the accuracy of measurement of the strain gauge 1 can be prevented from decreasing.

Note that, according to studies by the present inventors, when the resistor 30 is not a Cr composite film (but is, for example, conventionally-used Cu—Ni, Ni—Cr, etc.), no noise is superimposed on the output voltage, in the same experiment, even if the barrier layer is not provided. It then follows that the problem that electromagnetic wave noise and noise due to static electricity are likely to be superimposed on output voltage and the effect that such noise can be removed by providing a barrier layer are unique to those highly sensitive strain gauges having a gauge factor of 10 or more, and are new findings by the present inventors.

To make the strain gauge 1, first, the substrate 10 is prepared, and a metal layer (referred to as a "metal layer" A for ease of explanation) is formed on the upper surface 10a of the substrate 10. The metal layer A is a layer that is ultimately patterned so as to serve as the resistor 30, the conductive traces 40, and the electrodes 50. Therefore, the material and the thickness of the metal layer A are the same as those of the resistor 30, the conductive traces 40, and the electrodes 50 described above.

The metal layer A can be formed, for example, by magnetron sputtering which uses, as a target, a raw material that can form the metal layer A. The metal layer A may be formed by using reactive sputtering, vapor deposition, arc ion plating, pulse laser deposition, and so forth, instead of magnetron sputtering.

From the perspective of achieving stable gauge characteristics, before forming the metal layer A, it is preferable to vacuum-form a functional layer of a predetermined thickness as an underlying layer, over the upper surface 10a of the substrate 10 by, for example, conventional sputtering.

In the present disclosure, a functional layer refers to a layer having a function of promoting the crystal growth of at least the upper metal layer A (resistor 30). The functional layer preferably further has a function of preventing oxidation of the metal layer A due to the oxygen and moisture contained in the substrate 10, a function of improving the adhesion between the substrate 10 and the metal layer A, and so forth. The functional layer may also have other functions as well.

The insulating resin film that constitutes the substrate 10 contains oxygen and moisture. In particular, when the metal layer A contains Cr, Cr forms a self-autoxidized film, and it is therefore effective if the functional layer has a function of preventing oxidation of the metal layer A.

The material of the functional layer is not particularly limited as long as it at least has a function of facilitating the crystal growth of the metal layer A (resistor 30), which is an upper layer, and can be selected in accordance with the purpose of use. The material may be, for example, one or more types of metals selected from the group consisting of Cr (chromium), Ti (titanium), V (vanadium), Nb (niobium), Ta (tantalum), Ni (nickel), Y (yttrium), Zr (zirconium), Hf (hafnium), Si (silicon), C (carbon), Zn (zinc), Cu (copper), Bi (bismuth), Fe (iron), Mo (molybdenum), W (tungsten), Ru (ruthenium), Rh (rhodium), Re (rhenium), Os (osmium), Ir (iridium), Pt (platinum), Pd (palladium), Ag (silver), Au (gold), Co (cobalt), Mn (manganese), and Al (aluminum), an alloy of some of the metals in this group, or a compound of some of the metals in this group.

Examples of the above alloy include FeCr, TiAl, FeNi, NiCr, CrCu, and the like. Examples of the above compound include TiN, TaN, $Si_3N_4$, $TiO_2$, $Ta_2O_5$, $SiO_2$, and the like.

When the functional layer is formed from a conductive material such as a metal or an alloy, the film thickness of the functional layer is preferably 1/20 or less of the film thickness of the resistor. When the film thickness of the functional layer is in this range, it is possible to facilitate the crystal growth of α-Cr, and prevent a situation where part of the current flowing in the resistor flows into the functional layer and lowers the sensitivity of strain detection.

When the functional layer is formed from a conductive material such as a metal or an alloy, the film thickness of the functional layer is more preferably 1/50 or less of the film thickness of the resistor. When the film thickness of the functional layer is in this range, it is possible to facilitate the crystal growth of α-Cr, and prevent, more effectively, a situation where part of the current flowing in the resistor flows into the functional layer and lowers the sensitivity of strain detection.

When the functional layer is formed from a conductive material such as a metal or an alloy, the film thickness of the functional layer is even more preferably 1/100 or less of the film thickness of the resistor. When the film thickness of the functional layer is in this range, it is possible to prevent, even more effectively, a situation where part of the current flowing in the resistor flows into the functional layer and lowers the sensitivity of strain detection.

When the functional layer is formed from an insulating material such as an oxide or a nitride, the film thickness of the functional layer is preferably 1 nm to 1 μm. When the film thickness of the functional layer is in this range, it is possible to facilitate the crystal growth of α-Cr, and form a film with ease without forming cracks in the functional layer.

When the functional layer is formed from an insulating material such as an oxide or a nitride, the film thickness of the functional layer is more preferably 1 nm to 0.8 μm. When the film thickness of the functional layer is in this range, it is possible to facilitate the crystal growth of α-Cr, and form a film even more easily without forming cracks in the functional layer.

When the functional layer is formed from an insulating material such as an oxide or a nitride, the film thickness of the functional layer is even more preferably 1 nm to 0.5 μm. When the film thickness of the functional layer is in this range, it is possible to facilitate the crystal growth of α-Cr, and form a film even more easily without forming cracks in the functional layer.

Note that the plan shape of the functional layer is patterned substantially the same as the plan shape of the resistor illustrated in FIG. 1, for example. However, the plan shape of the functional layer does not necessarily have to be substantially the same as the plan shape of the resistor. When the functional layer is formed from an insulating material, it does not have to be patterned in the same shape as the plan shape of the resistor. In this case, the functional layer may be formed solidly at least in the region where the resistor is formed. Alternatively, the functional layer may be formed solidly over the entire upper surface of the substrate 10.

Also, when the functional layer is formed from an insulating material, the functional layer may be made relatively thick, such as 50 nm thick or more and 1 μm thick or less, and may be formed in a solid shape, so that the thickness and the surface area of the functional layer increase, and the heat that is generated when the resistor warms up can be readily dissipated to the substrate 10 side. As a result of this, with the strain gauge 1, it is possible to reduce the decrease of the accuracy of measurement due to the resistor's self-heating.

The functional layer can be vacuum-formed by, for example, conventional sputtering, in which a raw material that can form the functional layer is used as a target and an Ar (argon) gas is introduced into a chamber. By using conventional sputtering, the functional layer is formed while the upper surface 10a of the substrate 10 is being etched with Ar, and therefore it is possible to form the functional layer only in a minimal amount, and achieve an effect of improved adhesion.

However, this is simply one example of the method of forming the functional layer, and the functional layer may be formed by using other methods as well. For example, a method may be used here in which: before the functional layer is formed, the upper surface 10a of the substrate 10 is activated by plasma treatment using Ar or the like, so as to gain an adhesion improving effect; and subsequently, the functional layer is vacuum-formed by magnetron sputtering.

The combination of the material of the functional layer and the material of the metal layer A is not particularly limited and can be selected in accordance with the purpose of use. For example, it is possible to form a Cr composite film by using Ti as the main component of the functional layer and α-Cr (alpha-chromium) as the main component of the first metal layer.

In this case, the first metal layer can be formed by magnetron sputtering, in which a raw material that can form a Cr composite film is used as a target, and an Ar gas is introduced into a chamber. Alternatively, reactive sputtering, which targets pure Cr and introduces an appropriate amount of nitrogen gas into a chamber with an Ar gas, may be used to form the metal layer A. In this case, by changing the amount and pressure (nitrogen partial pressure) of nitrogen gas to be introduced, adjusting the heating temperature by providing a heating step, and so forth, it is possible to adjust the proportions of CrN and $Cr_2N$ contained in the Cr composite film, as well as the proportion of $Cr_2N$ in CrN and $Cr_2N$.

According to these methods, the growth surface of the Cr composite film is defined based on the functional layer consisting of Ti, and a Cr composite film, in which α-Cr having a stable crystalline structure is the main component, can be formed. Also, Ti that constitutes the functional layer is diffused in the Cr composite film, so that Improved gauge characteristics can be gained. For example, the gauge factor of the strain gauge 1 can be made 10 or more, and the gauge factor temperature coefficient TCS and the resistance temperature coefficient TCR can be kept in the range of −1,000 ppm/degrees Celsius to +1,000 ppm/degrees Celsius. Note that, when the functional layer is formed from Ti, the Cr composite film might contain Ti or TiN (titanium nitride).

Note that, when the metal layer A is a Cr composite film, the functional layer consisting of Ti has all of: the function of facilitating the crystal growth of the metal layer A; the function of preventing oxidation of the metal layer A due to the oxygen or moisture contained in the substrate 10; and the function of improving the adhesion between the substrate 10 and the metal layer A. The same applies when Ta, Si, Al, or Fe is used for the functional layer, instead of Ti.

In this way, by providing a functional layer in a lower layer of the metal layer A, it becomes possible to facilitate the crystal growth of the metal layer A, and fabricate a first metal layer consisting of a stable crystalline phase. As a result of this, the stability of gauge characteristics in the strain gauge 1 can be improved. Furthermore, since the material to constitute the functional layer is diffused in the metal layer A, the strain gauge 1 can have improved gauge characteristics.

Next, the metal layer A is patterned by photolithography, and the flat resistor 30, conductive traces 40, and electrodes 50 shown in FIG. 1 are formed.

Figure 5:
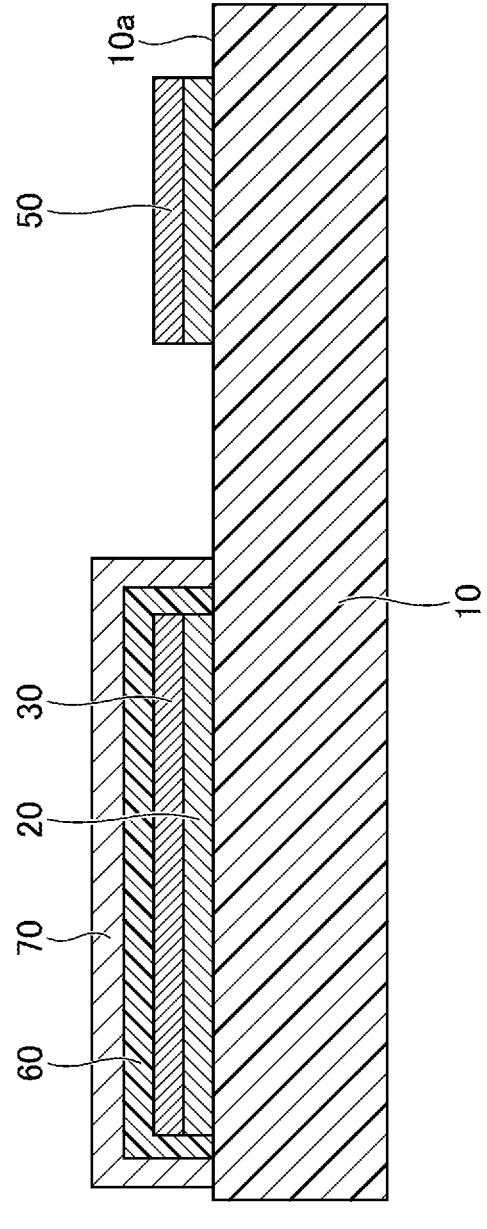
FIG. 5 is a cross-sectional view (example 2) that illustrates an example of the strain gauge according to the first embodiment.

Note that, when a functional layer is provided on the upper surface 10a of the substrate 10 as a base layer for the resistor 30, the conductive traces 40, and the electrodes 50, the strain gauge 1 has the cross-sectional shape shown in FIG. 5. The layer denoted by the reference sign 20 is the functional layer. The plan shape of the strain gauge 1 when the functional layer 20 is provided is, for example, the same as that shown in FIG. 1. However, as described above, the functional layer 20 may be formed solidly in part or all of the upper surface of the substrate 10.

Next, an insulating layer 60 is formed on the upper surface 10a of the substrate 10 so as to cover the resistor 30 and expose the electrodes 50. As long as the insulating layer 60 covers at least the resistor 30, the insulating layer 60 may cover part or all of the conductive traces 40. The material and thickness of the insulating layer 60 are as described above.

When the material of the insulating layer 60 is an organic material, the method of forming the insulating layer 60 is not particularly limited, and can be selected as appropriate according to the purpose of use. The insulating layer 60 can be produced, for example, by laminating a semi-cured thermosetting insulating resin film over the upper surface 10a of the substrate 10, so as to cover the resistor 30 and expose the electrodes 50, followed by curing by heating.

When the material of the insulating layer 60 is an inorganic material, the method of forming the insulating layer 60 is not particularly limited, and can be selected as appropriate according to the purpose of use. Examples include a method of forming a film by a vacuum process such as sputtering, plating, chemical vapor deposition (CVD) or by a solution process such as spin coating or a sol-gel method, and then patterning the film by using photolithography.

Next, a barrier layer 70 to cover the insulating layer 60 is formed. The material and thickness of the barrier layer 70 are as described above. The barrier layer 70 can be formed on the insulating layer 60 by, for example, sputtering or plating. Through the above steps, the strain gauge 1 is completed.

<Modification 1 of the First Embodiment>

A modification 1 of the first embodiment shows an example in which a conductive layer is provided on the lower surface side of the substrate 10. In addition, in modification 1 of the first embodiment, the description of the same components as those of the above-described embodiment may be omitted.

Figure 6:
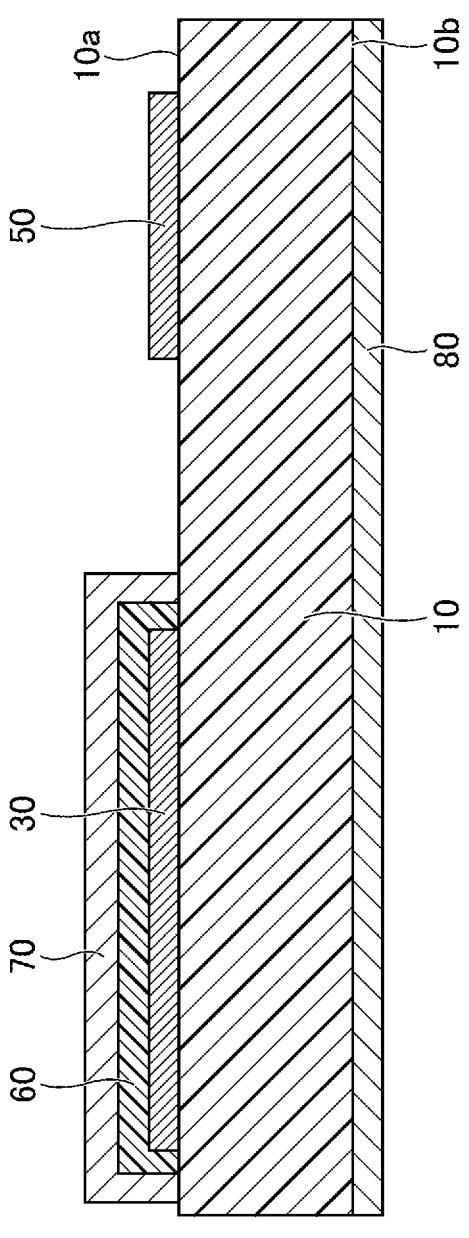
FIG. 6 is a cross-sectional view that illustrates an example of a strain gauge according to a modification 1 of the first embodiment.

FIG. 6 is a cross-sectional view that illustrates a strain gauge according to modification 1 of the first embodiment. Note that the plan view of the strain gauge according to modification 1 of the first embodiment is the same as that of FIG. 1.

Referring to FIG. 6, the strain gauge 1A differs from the strain gauge 1 (see FIG. 1, FIG. 2, etc.) in that it has a conductive layer 80.

In the strain gauge 1A, the conductive layer 80 is formed on the lower surface 10b of the substrate 10. Examples of materials for the conductive layer 80 include Cr, Ti, Cu, AL, C, Si, and conductive resins. Among these, metals are preferable, and it is particularly preferable to use Cr because it has a high Young's modulus. The thickness of the conductive layer 80 can be, for example, 0.01 μm or more and 1 mm or less. The conductive layer 80 can be formed over the lower surface 10b of the substrate 10 by, for example, sputtering, plating, and so forth.

By forming the conductive layer 80 over the lower surface 10b of the substrate 10, the hardness of the whole strain gauge 1A can be increased, so that the shape stability of the strain gauge 1A is improved. As a result of this, the strain gauge 1A is protected from mechanical noise, so that higher accuracy of measurement can be achieved. The conductive layer 80 is preferably formed over the entire lower surface 10b of the substrate 10. Since the conductive layer 80 is formed over the entire lower surface 10b of the substrate 10, the effect of protection from mechanical noise is enhanced.

Although a preferred embodiment and other forms of the present disclosure have been described above in detail as examples, the present disclosure is by no means limited to these examples, and a variety of modifications and replacements can be introduced to the above examples without departing from the scope set forth in the claims.

This international application is based and claims priority to Japanese Patent Application No. 2021-001553, filed Jan. 7, 2021, the entire contents of which are incorporated herein by reference.

REFERENCE SIGNS LIST

1, 1A strain gauge
10 substrate
10a upper surface
10b lower surface
20 functional layer
30 resistor
30$e_1$, 30$e_2$ end
40 conductive trace
50 electrode
60 insulating layer
70 barrier layer
80 conductive layer

The invention claimed is:

1. A strain gauge comprising:
a flexible substrate;
a resistor made from a film containing Cr, CrN, and $Cr_2N$, on one surface of the substrate;
an insulating layer covering the resistor; and
a conductive barrier layer covering the insulating layer, wherein the conductive barrier layer includes
a first layer portion extending over a surface of the resistor via the insulating layer, and
a second layer portion extending over side surfaces of the resistor via the insulating layer, and continuously connected to the first layer portion.

2. The strain gauge according to claim 1, wherein the insulating layer is made from an organic material.

3. The strain gauge according to claim 1, wherein the barrier layer is made from a metal, an alloy, or a laminated film in which metals, alloys or both are laminated.

4. The strain gauge according to claim 1, further comprising a conductive layer formed on the other surface of the substrate.

5. The strain gauge according to claim 1, wherein a gauge factor is 10 or more.

6. The strain gauge according to claim 1, wherein the CrN and the $Cr_2N$ contained in the resistor are 20% by weight or less.

7. The strain gauge according to claim 6, wherein a proportion of the $Cr_2N$ in the CrN and the $Cr_2N$ is 80% or more by weight and less than 90% by weight.

* * * * *